United States Patent [19]

Dilay

[11] Patent Number: 4,675,494

[45] Date of Patent: Jun. 23, 1987

[54] PREHEAT TIME COMPENSATING WELD CONTROL

[75] Inventor: Walter Dilay, Dearborn, Mich.

[73] Assignee: Ford Motor Company, Dearborn, Mich.

[21] Appl. No.: 799,365

[22] Filed: Nov. 18, 1985

[51] Int. Cl.⁴ ............................................. B23K 11/24
[52] U.S. Cl. ................................. 219/91.21; 219/91.1; 219/110
[58] Field of Search ................... 219/110, 109, 86.41, 219/91.1, 91.21

[56] References Cited

U.S. PATENT DOCUMENTS 2,021,477 11/1935 Bohn .
2,313,941 3/1943 Humphrey .
2,897,444 7/1959 Garscia et al. .
3,155,809 11/1964 Griswold .
3,418,444 12/1968 Ruehlemann .
3,538,293 11/1970 Procacino .
3,578,940 5/1971 Sands .
3,899,653 8/1975 Spinnato .
4,072,843 2/1978 Szabo .
4,329,561 5/1982 Schafer et al. ..................... 219/110
4,456,810 6/1984 Schumacher et al. .

Primary Examiner—Clifford C. Shaw
Attorney, Agent, or Firm—Frank G. McKenzie; Donald J. Harrington

[57] ABSTRACT

A spot weld controller includes a current transformer, a current amplitude detector, a keypad data entry, a solenoid, an air valve and pneumatic cylinder, welding electrodes, a connection to an electric power supply, a source of pressurized air, and programmed logic that controls the sequential operation of the equipment. The controller performs a weld cycle that includes a preheat period, during which inorganic material that bonds metal laminas together is heated and forced away from the electrodes, and a weld period, during which electric current at welding amplitude produces the weld after the metal lamina contact one another.

7 Claims, 10 Drawing Figures

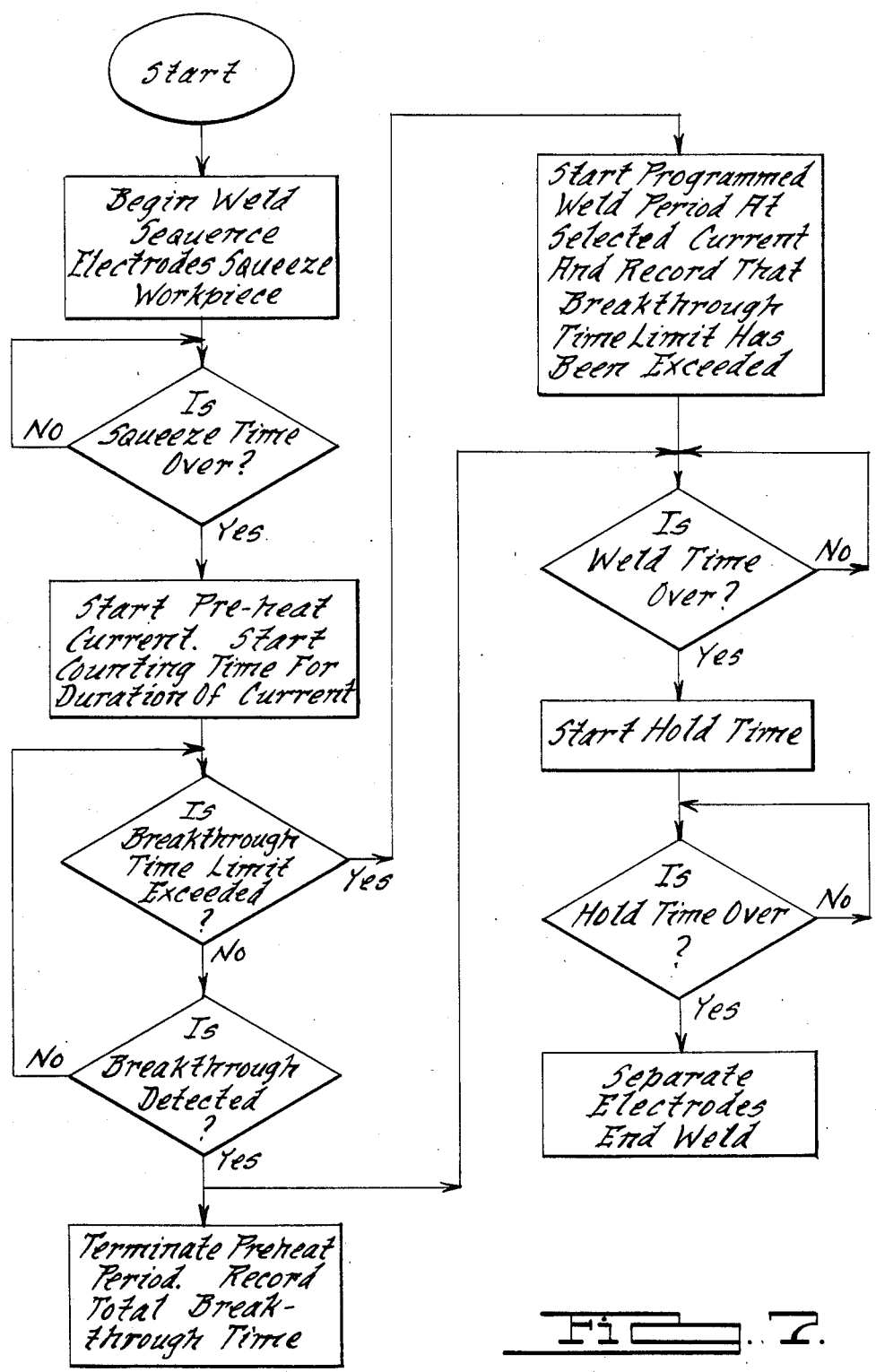

PREHEAT TIME COMPENSATING WELD CONTROL

BACKGROUND OF THE INVENTION

1. Field of the Invention

This invention relates to a weld control for spot welding a laminated workpiece including metal sheets and a viscoelastic material located between the metal. More particularly, the invention pertains to a method for detecting imminent and actual contact of the metal laminas with one another and a method for optimizing the length of the period that precedes the viscoelastic material being forced away from the weld area prior to welding the metal.

2. Description of the Prior Art

When electrical resistance spot welds are made in a workpiece that includes outer laminas of metal, such as low carbon steel or high strength steel, separated by an intermediate, non-metallic lamina such as a viscoelastic thermoplastic material, an unacceptable variation in weld quality can result. When the weld is made in the conventional way by passing electrical current between the welding electrode and through the workpiece at a current amplitude and during a period that is suitable for making a good spot weld in a workpiece that does not contain the separating lamina, the resulting weld can vary in quality from one that is only partially made to one that is substantially undersized in relation to acceptable standards. The quality of the weld is unacceptable because there is a partial or complete loss of metal-to-metal contact between the metal laminas during the period when electrical current is applied at welding amplitudes to the electrodes.

The viscoelastic lamina is substantially less conductive thermally and electrically than the metal and its presence between the metal laminas prevents the completion of a low resistance electrical circuit between the electrodes.

A spot weld is produced by a dynamic process wherein the metal is melted initially on an axis that is equally distant from the electrodes and then axially toward the electrodes and radially outward from the axis. The electrodes apply a clamping force to the workpiece which confines the melted metal. The process is stopped by terminating the welding current before the melt exceeds the electrode diameter. Otherwise, an unacceptable shower of sparks and hot metal will issue from the weld in a process caused expulsion. The magnitude of the weld current and resistivity of the workpiece determine the speed at which a weld nugget is produced. Metal expulsion that produces the shower of sparks sets one limit for the current; however, when weld current is too low, merely lengthening the period during which the power is supplied to the electrodes may not produce an acceptable weld nugget. The electrical resistivity of the workpiece is an important factor affecting nugget size. The temperature at which each element of the workpiece enters the plastic range is another important variable.

The electrical current shunt path through one or more completed welds adjacent to the weld currently being made draws electrical current from the location where the weld is being made. The indicated weld current supplied to the electrodes is greater than the current actually applied to the weld spot.

In making spot welds in laminated workpieces of the type described, weld quality depends on the rate at which the intermediate thermoplastic lamina is forced radially outward from the vicinity of the electrodes due to the application of pressure at the electrodes and whether there is metal-to-metal contact between the metal laminas when the welding cycle begins. In a conventional electrical resistant spot weld control, the length of the period during which laminated workpieces of this type are preheated to produce flow of the intermediate thermoplastic material away from the electrodes and the length of time during which current at welding magnitudes is applied to the electrodes are preselected, fixed values. In actual practice, the length of time required to assure that the intermediate thermoplastic material has moved from the vicinity of the electrodes prior to welding varies substantially depending on the condition of the electrodes, the material of the workpiece, the surface condition of the workpiece and other parameters that are difficult to quantify. It is preferable that some means be made available to account for the widely varying length of time needed to assure that metal-to-metal contact between the metal laminas exists before welding current is applied.

SUMMARY OF THE INVENTION

It is a principal object of this invention to produce a method for weld control that terminates automatically the preheat period, during which a lamina located between the metal laminas to be welded is forced by pressure and temperature to move from the vicinity of the welding electrodes, and then begins the application of current at welding amplitudes.

It is another object of this invention to provide a spot weld control method that detects the imminent occurrence of contact between the metal laminas, called breakthrough, by sensing a rapid increase in current through the workpiece, or a sharp drop in resistance across the electrodes or a sharp drop in voltage across the electrodes.

It is another object of this invention to provide a method for weld control that will determine if the actual length of the preheat period exceeds repeatedly a predetermined length of the preheat period and automatically adjusts the amplitude of the preheat current to a higher value to shorten the length of the preheat period.

It is still another object of this invention to provide a method for spot weld control that varies the magnitude of preheat current during the preheat period from an initially high current amplitude continuously to a lower current level immediately before the occurrence of breakthrough so that metal expulsion can be avoided when the metal laminates come in contact while high weld current is applied to the electrode.

It is still another object of the present invention to provide a method for weld control that produces a period during the weld portion of the cycle in which no weld current is applied to the welding electrodes following the application of electrical current at normal welding amplitudes.

In realizing these and other objectives, the method for making electrical resistance spot welds in a workpiece located between welding electrodes that includes conductive metal and material having a substantially lower conductivity than the metal includes selecting an amplitude of alternating current to be applied initially to the welding electrodes and selecting the number of cycles of current to be applied during a preheat period.

A second magnitude of welding current is selected to be applied to the electrodes and a number of cycles for its application during a welding period that follows the preheat period. Thereafter, the workpiece is placed between the welding electrodes and the selected currents are supplied in the proper order. According to the method, the weld control detects the occurrence of a rising current between the electrodes or a decrease in resistance or voltage across the electrodes while the preheat current is applied. Immediately thereafter, the magnitude of the current supply to the electrode is changed to the preselected amplitude of the working current and the workpiece is welded by applying current at the welding magnitude for the number of cycles selected for the welding period.

BRIEF DESCRIPTION OF THE DRAWINGS

FIG. 7 is a logic flow diagram representing an algorithm whose execution controls the welding process in a method employing the principles of this invention.

DESCRIPTION OF THE PREFERRED EMBODIMENT

The method according to this invention requires that the magnitude of current through the welding electrodes or the voltage or resistance across the welding electrodes be determined.

Figure 1:
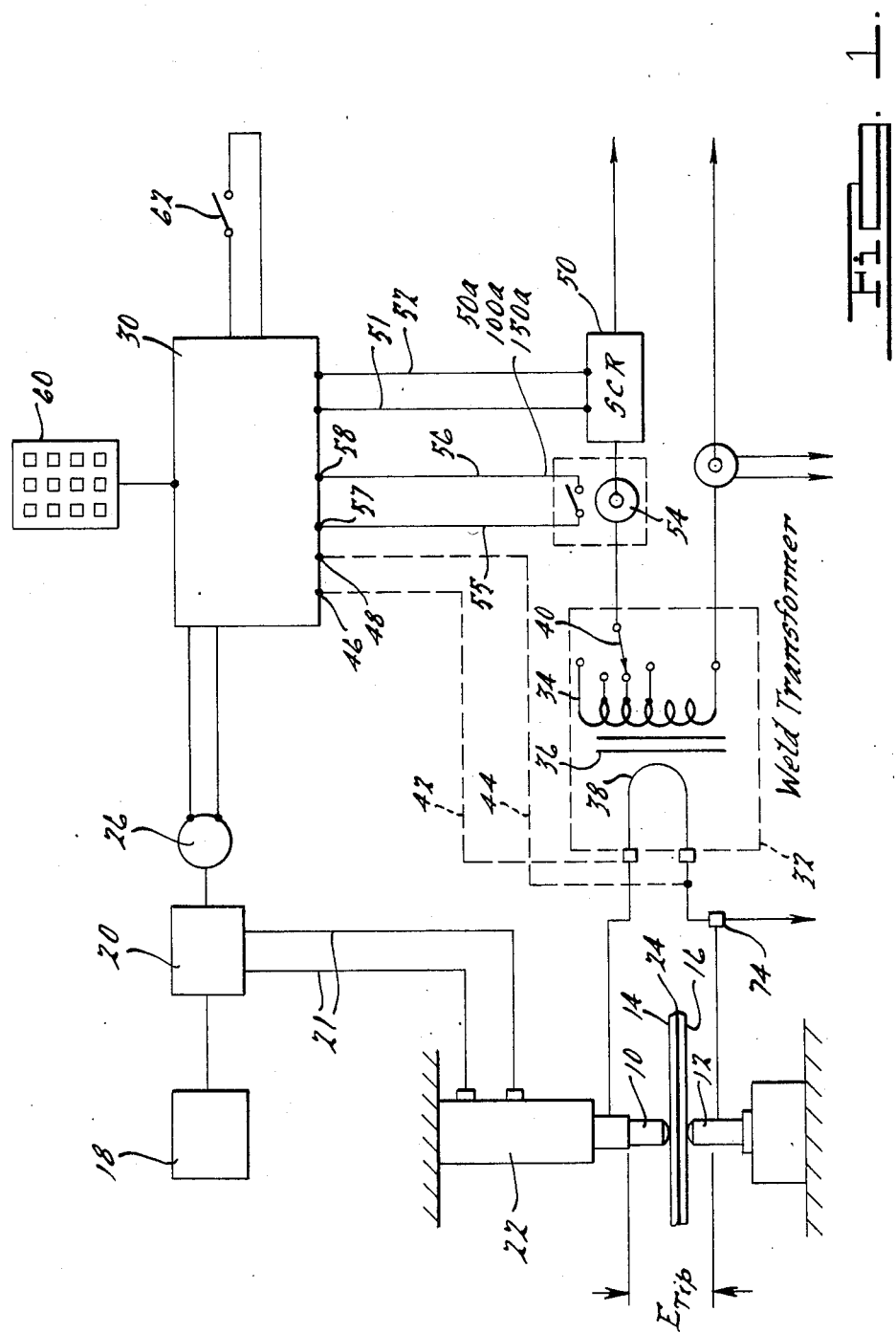
FIG. 1 is a schematic diagram of the welding current transformer, electrodes, weld control and current detector for a resistant spot welder for use with the method of this invention.

Referring first to FIG. 1, welding electrodes 10, 12 are forced into contact with the lamina 14, 16 of a workpiece due to the effect of a pressure force developed on the upper electrode 10 when a source of pressurized air 18 is open through an air valve 20 to a cylinder 22 and to a piston moveably mounted within the cylinder. The lower electrode is fixed in position and reacts the pressure force applied to the upper electrode. The metal laminas of the workpiece are separated from one another by a thickness of material that is substantially less conductive than the metal, e.g., a visco-elastic material 24. The open and closed state of air valve 20 is controlled through an electrical solenoid 26 whose coil is energized through operation of a welding control 30, which may include a microprocessor such as the 8-bit 6800 microprocessor or the 16-bit 68000 microprocessor produced by Motorola Corporation.

A weld current transformer 32 has a primary winding 34 connected through a magnetic circuit 36 to a secondary winding 38 through which alternating current is supplied to the welding electrodes. The number of turns of the secondary winding is a constant number and the number of turns of the primary winding is variable according to the setting of a switch 40, which is moved manually among several terminals or taps on the primary winding. The current in the secondary circuit, which is applied to the welding electrodes, is proportional to the current in the primary circuit times the number of turns in the primary circuit and is inversely proportional to the number of turns in the secondary circuit. The electrical power supply to the primary circuit is approximately 460 volts at 60 Hz. The current in the primary circuit is about 100 amps, and the current in the secondary circuit is about 10 K amps.

Cables 42 and 40 are connected to the electrodes 10 and 12, respectively, and are connected to input ports of the weld control wherein the voltage across the electrodes is determined.

A silicon control rectifier 50 connected in series with the primary circuit of the current transformer 32 is a solid state device that controls the rms level of the current in the primary circuit by delaying conduction of the line current to that portion of its sine wave that will produce the required rms current. The weld control 30 connected through lines 51 and 52 to SCR 50 controls that period through which the SCR conducts in accordance with the requirements of the weld schedule and the level of preheat current and welding current.

Current transformer 54 is a toroidal coil through the central axis of which an electrical wire is passed to the source of line voltage. When the SCR conducts, current is produced in the circuit that includes conductors 55 and 56, wherein a signal is produced that is used to detect the magnitude of current supplied to the primary circuit. This signal is applied as input to the weld control at input ports 57, 58.

When the welding current is changing rapidly, as where the current is crossing zero, induced voltages can cause errors in the values of the calculated circuit variables; therefore, a differentiator is included in the welding control to develop a narrow pulse when the primary current is at the top of its sine wave. This pulse is used to assure that division of the electrode voltage by the line current is performed with values evaluated while current is substantially a maximum and the first derivative of current with respect to time, dI/dt, is zero or nearly zero. This assures that induced voltage effects are minimized. U.S. Pat. No. 4,456,810 describes this aspect of the operation of the weld control circuit in more detail. This assures that produced voltage effects are minimized. The entire disclosure of that patent is incorporated herein by reference.

The welding control includes a keypad 60, by means of which preheat current, the duration of the preheat cycle, welding current, the duration of the welding cycle, and other relevant parameters can be input and then processed automatically. When switch 62 is closed, the welding control is enabled, and when the solenoid 26 is activated, air valve 20 connects the source of pressurized air to cylinder 22. When it is pressurized, the cylinder causes the electrodes to apply contact pressure to the upper and lower surfaces of the workpiece.

Figure 2:
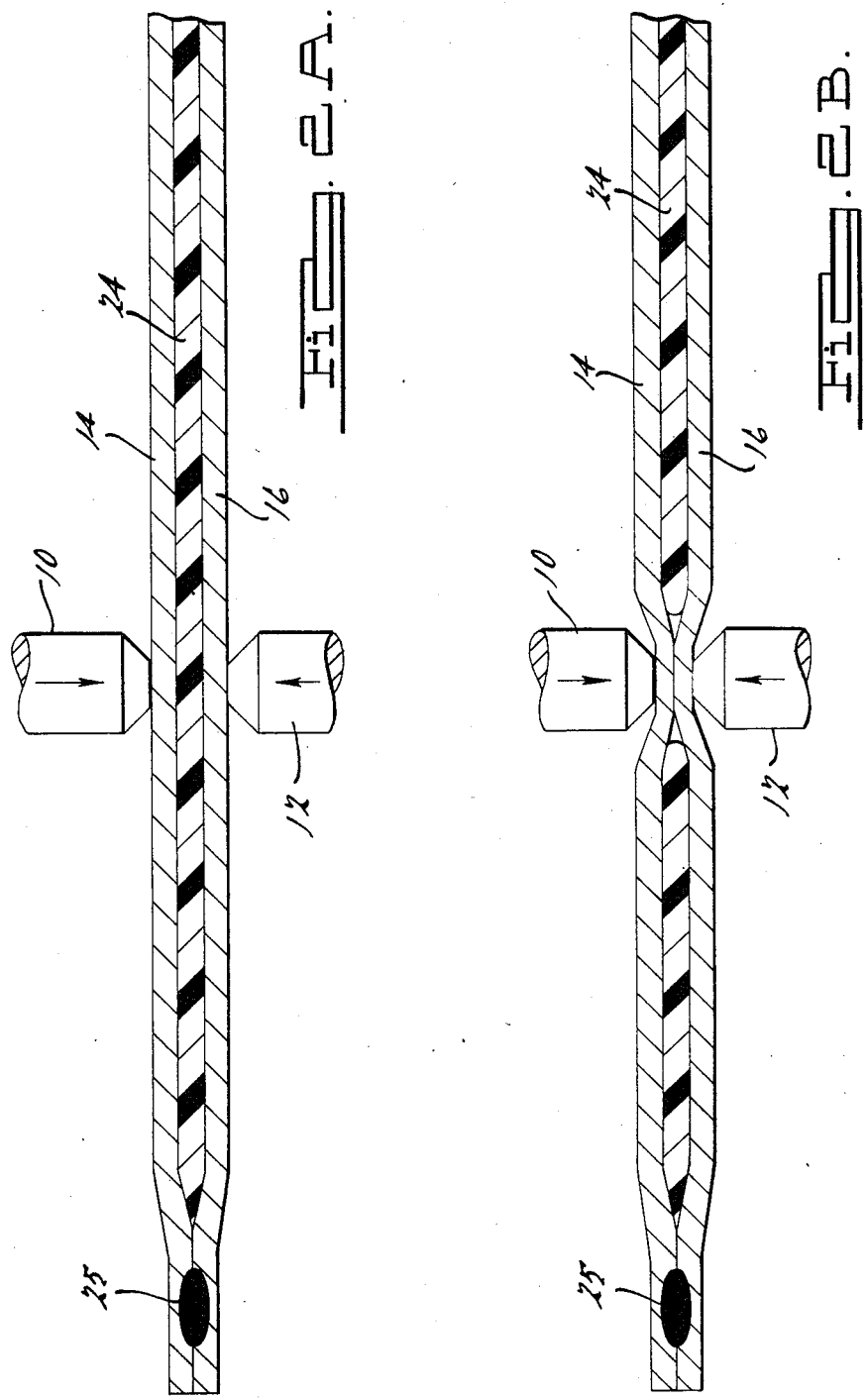
FIGS. 2A and 2B are cross sections through the center line of the welding electrodes and the workpiece showing the workpiece before the welding process begins and after the weld is made.

FIG. 2A shows the form of the workpiece to be welded located between electrodes 10 and 12. The workpiece includes at least two sheets of metal 14, 16 bonded or joined with a viscoelastic thermoplastic lamina 24. Pneumatic pressure applied to the electrode before weld current is supplied is maintained throughout the weld process. A low amplitude electrical current passing between the electrodes heats the metal laminates and thermoplastic laminate for a period of time called the preheat period, during which the metal laminas are separated by the thickness by lamina 24. Typically when large panels of this configuration are spot welded, a shunt path for the flow of electrical current between the electrodes is provided by a spot weld 25 that is distant from the location of the weld at the electrodes. The shunt path and weld 25 provide an electrical circuit of comparatively lower electrical resistance than the electrical circuit that includes the electrodes, the metal laminas and lamina 24. The shunt path through spot weld 25 provides the means for electrically heating the thermoplastic lamina, and the pressure applied to the electrodes produces a squeezing effect that causes laminate 24 to be forced away from the vicinity of the weld electrodes as seen in FIG. 2B.

During the preheat portion of the weld cycle, after laminate 24 is heated, the electrical current flowing through the shunt path softens the nonconductive organic material 24, causes it to spread and eventually allows metal-to-metal contact between laminas 14 and 16. The duration of the preheating period that precedes breakthrough varies unpredictably among the locations of the spot welds on a single workpiece and among workpieces because of the variations in the chemical composition of the metal and inorganic laminates and their surface conditions.

Figure 3:
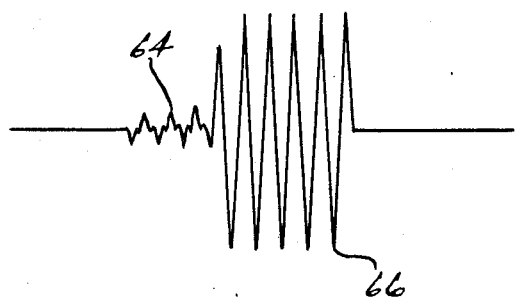
FIG. 3 is a waveform showing the variation with time of the current applied to the welding electrodes during a preheat period and a weld period employing a method that is known in the prior art.

In prior art weld controllers wherein the number of weld current cycles can be specified, the specification is made with respect to the total number of current cycles to be applied during the entire welding process without distinguishing between the lengths of the periods that precede and follow the occurrence of breakthrough. The current in the secondary circuit 38, which flows between the electrodes and through the workpiece, is applied at two levels, a first preheat current at approximately 900 amps and then a welding current at approximately 9.5 Kamps. Referring to FIG. 3, the preheat current waveform is indicated at 64 and the welding current waveform at 66. Nine cycles of current are arbitrarily set as the entire number of cycles required to make the weld without regard to the time required to heat the organic material located between the metal lamina and to cause flow of this material away from the vicinity of the electrodes due to the effect of heat and the concurrent application of pressure applied to the electrodes. FIG. 3 shows that after three current cycles, the metal lamina are brought into mutual contact because the organic material will have been forced away from the vicinity of the electrodes. Thereafter, the residual six cycles of welding current are applied to the electrode in order to make the weld. Experience has shown that when a fixed length weld schedule such as this is used to weld a laminated workpiece, the weld is undersized principally because the metal lamina are not in contact with one another before the welding current is applied due to the presence of the organic material.

Figure 4A:
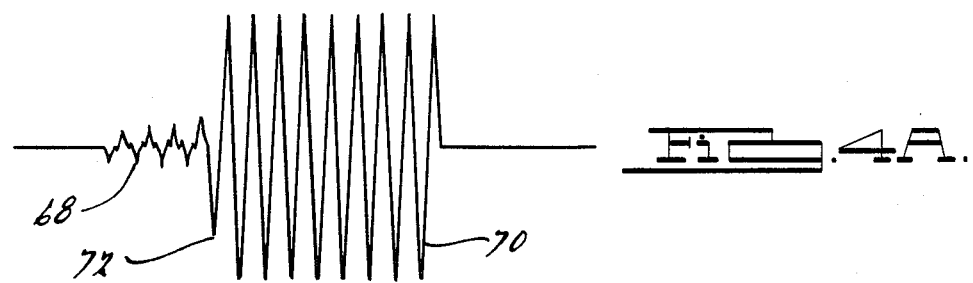
FIG. 4A is a waveform of the alternating current that flows through the welding electrodes and FIG. 4B is a waveform of the resistance across the electrodes during a preheat period and a welding period.

FIG. 4 shows a welding cycle according to the method of this invention. Here, while the electrodes are forced together due to the application of pneumatic pressure, electric current at a predetermined preheat magnitude is applied until a breakthrough signal is produced. Thereafter, current at a predetermined and preselected welding amplitude is applied for a predetermined number of cycles. The preheat current waveform is indicated at 68 and the welding current waveform at 70. The welding period is automatically initiated by the weld control 30 when a sudden increase in welding current is detected, e.g., when current increases to the amplitude at 72 in FIG. 4A, or when a sudden decrease in voltage across the electrode is detected.

Figure 4B:
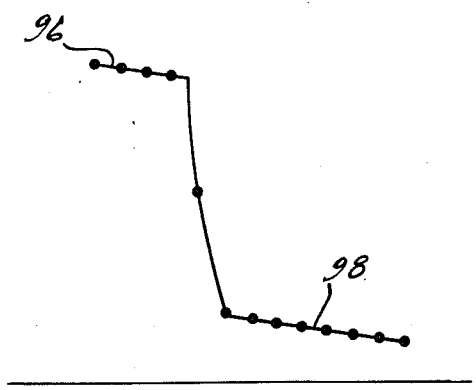

A third alternative indication used by a weld controller according to this invention for automatically beginning to apply weld current at a different amplitude than that applied during the preheat period is a sudden decrease in resistance across the electrodes. FIG. 4B shows the change of resistance that occurs during the preheat period at 96 and the weld period at 98. Notice that the resistance drops sharply after four preheat current cycles and that the current increases to the amplitude at 72, which is greater than the preheat amplitude 68 and less than the weld current amplitude 70. Thereafter, the resistance declines continually while the weld is made because the metal laminas melt and fuse together shortly after the current level is increased to the welding amplitude.

The variation of resistance with time is used in this invention to anticipate the imminent occurrence of breakthorugh. In FIG. 4B, the abrupt drop in resistance that follows the four current cycles 68 at preheat amplitude actually occurs before the metal laminas contact each other. The increase in current at 72 indicates that before the metal laminas contact one another, the viscoelastic material has been so reduced in thickness by elevated temperature and electrode pressure that the current between the electrodes rises because the resistance of the viscoelastic material decreases. It has been discovered that the change in resistance is a more sensitive indicator of a significant and sufficient reduction in thickness of the intermediate, non-metallic lamina than is the change of current between the electrodes or the change of voltage across the electrodes. The rate of change of resistance is a reliable, sensitive indication that breakthrough is soon to occur.

The occurrence of any of these three sudden changes in magnitude indicates that a substantial portion of the organic material has been forced from the vicinity of the electrode between the metal laminate and that the laminates have been brought substantially into contact. The occurrence of any rapid change in current can be detected by a Hall effect current monitor 74, whose output is connected to the welding control 30, or by a toroidal current transformer 54 located in the primary or secondary circuit. A sudden change in voltage across the electrodes detected by a circuit that responds to a decrease in electrode tip voltage can be used as input to the controller to indicate the occurrence of breakthrough. The waveform for the rapid change of resistance is indicated in FIG. 4B, which shows a rapid increase from the high level of resistance during the preheat portion of the cycle to the low level that continues during the welding portion of the cycle.

Figure 5:
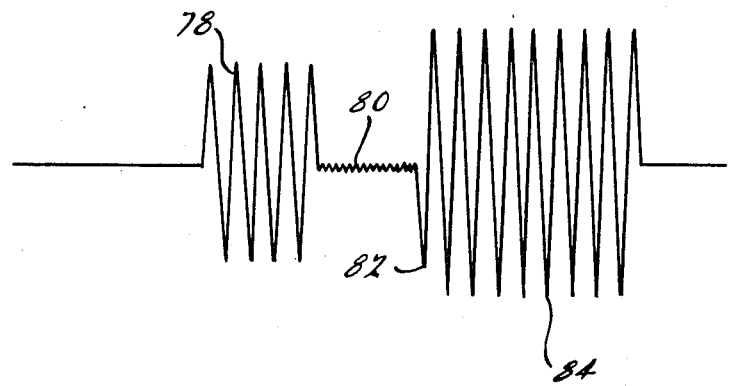
FIG. 5 is a waveform of the current that flows through the welding electrodes after breakthrough during a weld period, that includes a cooling period.

The magnitude of preheat current immediately before breakthrough is independently adjustable from the magnitude of the welding current. The preheat current can be greater or less than the welding current. According to the method of this invention, the current supplied to the welding electrodes during the preheat period can be varied according to a preselected schedule. For example, FIG. 5 shows, during a portion of the period that preceds breakthrough, a preheat current of large amplitude relative to the weld current that is held constant for a specified number of cycles or until the occurrence of a rapid decrease in resistance or voltage across the electrodes. Thereafter the weld current amplitude 78 is reduced to zero at 80 to allow a period of cooling during a specified number of cycles following breakthrough. While pressure is applied by the electrodes to the workpiece, the organic material moves away from the vicinity of the electrodes during the cooling period. When the resistance across the electrodes drops in magnitude or the current between the electrodes rises sharply as seen at 82, the amplitude of welding current is increased immediately to a preselected welding amplitude 84 and this value is maintained for the predetermined number of cycles during which the metal laminas are spot welded.

Figure 6A:
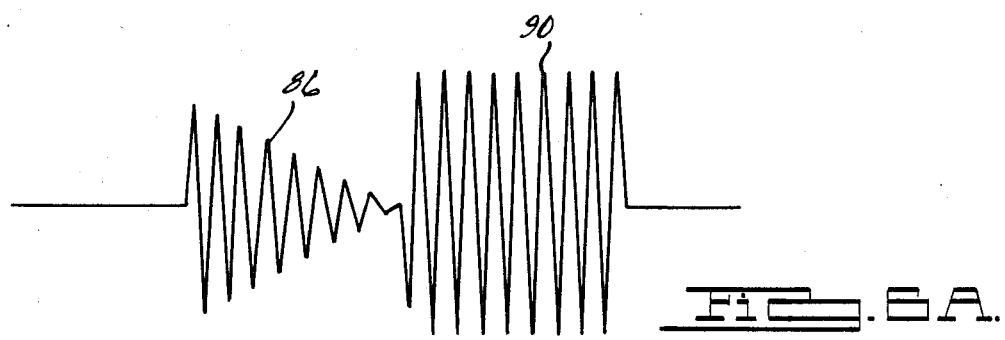
FIGS. 6A and 6B are waveforms of the resistance and current that flows through the welding electrodes during a preheat period in which the current magnitude declines after preheating and before welding.
Figure 6B:
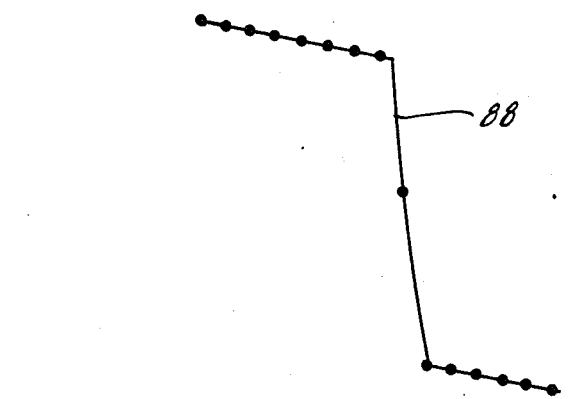

FIGS. 6A and 6B illustrate an alternate method for controlling the current during the preheat and welding periods. After preheat current at amplitude 78 is applied for a portion of the preheat period, the current is decreased continually during the rest of the preheat period at a specified rate 86 until breakthrough is detected at 88 by a rapid decrease in resistance across the electrodes or until a specified number of preheat current cycles has occurred. Thereafter, the amplitude of electrode current increases to the preselected welding amplitude 90 for the preselected number of cycles that determines the welding period. This schedule permits a gradual reduction of preheat current from a large amplitude in a predetermined period, preferably over four or five current cycles. The current reduction helps to avoid violent expulsion of molten metal that would otherwise occur at the instant the metal laminas are brought into contact with one another. When the preheat period includes either a continuously declining electrode current or a period during which electrode current is zero, the initial preheat current is greater than would ordinarily be applied to the welding electrodes during a preheat period in which the current amplitude is constant. If the preheat current is high when breakthrough occurs, the undesirable expulsion, seen as sparks that fly outward from the vicinity of the electrode, is likely to occur. However, when the preheat current declines from the high value or is discontinued for a portion of the preheat period, expulsion can be avoided and the preheat period shortened.

When the dynamic resistance across the welding electrodes is used as the signal for detecting the imminent occurrence of metal-to-metal contact between the metal laminas of the workpiece, the weld control 30 uses this signal to reduced the magnitude of preheat current sufficiently prior to of the occurrence of breakthough and to minimize expulsion at the instant of breakthrough.

There is a wide variation in the length of the breakthrough period, which has been seen to extend between four and twenty-three cycles for identical workpieces made from the same metal laminas, using the same inorganic material in the intermediate bonding layer and having the same thickness laminas. Experience has shown that a good spot weld can be made when welding current of the correct magnitude is applied for only six to ten cycles. However, if the actual preheat period exceeds the selected preheat period by a predetermined number of successive welding cycles when making several successive spot welds, then the weld control according to the present invention will automatically increase the amplitude of the preheat current, e.g., from 85% to 99% of the current capacity of the welder, while later welds are made. This increase in preheat current shortens the preheat period and increases productivity.

If, while making successive welds with a process controlled by the weld method of this invention, the period from the first application of the preheat current to the detection of breakthough exceeds the length of the preselected preheat period, then the weld control will automatically increase the number of cycles of current applied at welding current magnitudes. The algorithm that controls operation of the weld controller has the capacity to determine whether the preselected duration of the preheat period is too short in relation to actual experience and to increase automatically the magnitude of preheat current to adapt to recent experience in making spot welds. The algorithm of FIG. 6 shows the flow diagram that makes these changes automatically.

When the welding process is begun, the controller causes the pneumatic cylinder 22 to be pressurized through air valve 20 by energizing the winding of solenoid 26. This forces the electrodes 10, 12 to grasp and squeeze the workpiece for a period whose length is predetermined by the operator through keypad input or by reference to a value stored in computer memory. When that period is concluded, the preheat period begins. The amplitude of preheat current, expressed as a percentage of the current capacity of the welder, and the length of the preheat period, specified by the operator are set through data input to the controller from the keypad. An interval timer within the controller counts down during this period.

During the preheat period, the controller programmed logic inquiries or tests whether breakthrough has occurred by detecting a rapid and substantial decrease in resistance across the electrodes and whether the preheat period has expired. Preheat current continues to be applied while the period is unexpired and while breakthrough is undetected.

When breakthrough occurs, the length of the actual preheat period is recorded and stored in memory and compared to the length of the preselected preheat period. Then the weld current is applied for the preselected length of the weld period.

If breakthrough occurs after the preheat period has expired, the weld period is started and the controller records and stores in memory that the preheat period selected is too short compared to the actual length of the period. The controller counts the number of times the period is exceeded and compares the count to a number in memory. If the period is exceeded more often than the number, then the weld controller increases the amplitude of the preheat current while making welds in future executions of the control algorithm.

When the weld time expires, the controller continues to hold the workpiece for a short time. Later the pressure is removed from the electrodes and the workpiece is released.

Having described the preferred embodiment of my invention, what I claim and desire to secure by U.S. Letters Patent is:

1. A method for making an electrical resistance spot weld in a workpiece that includes metal and a material having substantially lower conductivity than the metal comprising:
   selecting the amplitude and time rate of change for the amplitude of the preheat current to be supplied to the electrodes and selecting the length of the preheat period for supplying said preheat current;

inserting the workpiece between the electrodes and forcing the components of the workpiece to be welded toward one another;

supplying the preheat current at the selected amplitude to the electrodes for a portion of the preheat period and varying the preheat current at the selected rate of change during another portion of the preheat period;

looking for a substantial rise in current between the electrodes or a substantial decrease in resistance or voltage across the electrodes during the preheat period;

stopping the supply of preheat current to the electrodes when the selected preheat period is expired or when said substantial change in current, voltage or resistance is detected; and supplying current at welding amplitude to the electrodes after the preheat current is stopped.

2. A method for making an electrical resistance spot weld in a workpiece that includes metals and a material having substantially lower conductivity than the metal comprising:

selecting an amplitude of the current to be applied to the electrodes and a number of cycles said current is to be applied during a preheat period;

selecting a magnitude of current to be applied to the electrodes during a welding period;

placing the workpiece between the electrodes;

supplying the selected preheat current to the electrodes;

looking for the occurrence of a rapid decrease in resistance across the electrodes during the preheat period;

reducing the preheat current during the remaining portion of the preheat period that follows the occurrence of the rapid decrease in resistance or voltage across the electrodes; and welding the workpiece by applying current to the electrodes at the welding current amplitude.

3. The method of claim 2 wherein reducing the preheat current includes stopping the application of preheat current to the welding electrodes.

4. The method of claim 2 wherein reducing the preheat current includes reducing the amplitude of preheat current continually at a linear rate until preheat current is stopped or until said increase in current or decrease in resistance on voltage occurs.

5. A method for continually making an electrical resistance spot weld in a workpiece that includes metal and a material having substantially lower conductivity than the metal comprising:

placing the workpiece between the electrodes;

supplying current at a selected preheat amplitude to the electrodes during a preheat period whose length is preselected;

looking for a substantial increase in current between the electrodes or a substantial decrease in resistance or voltage across the electrodes while the current is supplied;

determining whether the length of the period while preheat current is supplied and before the increase of current or decrease of resistance or voltage occurs exceeds the length of the predetermined period;

continuing to supply current at the selected preheat amplitude for a period longer than the preselected period until said increase in current or decrease in resistance or voltage occurs; and supplying current at welding amplitude to the electrodes until the spot weld is made.

6. The method of claim 5 further comprising:

increasing the amplitude of the preheat current if the selected length of the preheat period exceeds the length of the period while preheat current is supplied and before said increase in current or decrease in resistance or voltage occurs; and supplying said increased preheat current amplitude to the electrodes while making spot welds after the current spot weld is made.

7. A method for continually making an electrical resistance spot weld in a workpiece that includes metal and a material having substantially lower conductivity than the metal comprising:

locating the workpiece between the electrodes;

supplying preheat current to the electrodes for a predetermined period;

looking for a substantial increase in current between the electrodes or a substantial decrease in resistance or voltage across the electrodes while the current is supplied;

determining whether the length of the period while preheat current is supplied and before the increase of current or decrease of resistance or voltage occurs exceeds the length of the predetermined period;

increasing the amplitude of the preheat current if the predetermined length of the preheat period exceeds the actual length of the period while preheat current is supplied and before said increase in current or decrease in resistance or voltage occurs; and supplying said increased preheat current amplitude to the electrodes while making spot welds after the current spot weld is made.

* * * * *